(12) United States Patent
Adachi et al.

(10) Patent No.: US 11,906,080 B2
(45) Date of Patent: Feb. 20, 2024

(54) FLUID DEVICE

(71) Applicant: NIPPON PILLAR PACKING CO., LTD., Osaka (JP)

(72) Inventors: Tomohiro Adachi, Osaka (JP); Tomoyuki Koike, Osaka (JP); Atsushi Nakano, Osaka (JP); Toshihide Iida, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 729 days.

(21) Appl. No.: 16/982,876

(22) PCT Filed: Mar. 12, 2019

(86) PCT No.: PCT/JP2019/010070
§ 371 (c)(1),
(2) Date: Sep. 21, 2020

(87) PCT Pub. No.: WO2019/181657
PCT Pub. Date: Sep. 26, 2019

(65) Prior Publication Data
US 2021/0033225 A1 Feb. 4, 2021

(30) Foreign Application Priority Data
Mar. 22, 2018 (JP) .................. 2018-054140

(51) Int. Cl.
*F16L 17/067* (2006.01)
*F16J 15/10* (2006.01)
*F16L 19/02* (2006.01)

(52) U.S. Cl.
CPC .......... *F16L 17/067* (2013.01); *F16J 15/104* (2013.01); *F16L 19/0212* (2013.01)

(58) Field of Classification Search
CPC ..... F16L 17/067; F16L 23/22; F16L 19/0212; F16L 23/18; F16J 15/104
See application file for complete search history.

(56) References Cited

U.S. PATENT DOCUMENTS

2001/0045709 A1* 11/2001 Stobbart ............... F16L 23/18
277/602
2009/0091125 A1 4/2009 Takeda et al.
(Continued)

FOREIGN PATENT DOCUMENTS

| CN | 101403454 A | 3/2009 |
|---|---|---|
| CN | 101646886 A | 2/2010 |

(Continued)

OTHER PUBLICATIONS

International Searching Authority, International Search Report and Written Opinion for International Application No. PCT/JP2019/010070, dated Jun. 11, 2019, (10 pages), Japan Patent Office, Tokyo, Japan.

*Primary Examiner* — Zachary T Dragicevich
*Assistant Examiner* — James A Linford
(74) *Attorney, Agent, or Firm* — Alston & Bird LLP

(57) ABSTRACT

An integrated block 1 serving as a fluid device includes: a flow port 13 open to form one end of a passage P; an annular groove 14 arranged along an outer circumferential edge of the flow port 13, the annular groove 14 being open so as to insert the gasket 2 therein; a first tapered portion 17 arranged on a radially-inner side interior wall 14b of the annular groove 14 and sloped radially outward from an open end of the annular groove 14 in a depth direction of the annular groove 14; and a guide 18 arranged on a radially-outer side interior wall 14a of the annular groove 14, extending throughout a predetermined range D from the open end of the annular groove 14 in the depth direction, and having a (Continued)

larger diameter than an outer circumferential surface 22*a* of a second sealing portion 22 of the gasket 2.

7 Claims, 10 Drawing Sheets

(56) References Cited

U.S. PATENT DOCUMENTS

| | | | | |
|---|---|---|---|---|
| 2019/0301608 A1* | 10/2019 | Takeda | ..................... | F16J 15/10 |
| 2019/0368609 A1* | 12/2019 | Adachi | .................. | F16J 15/062 |
| 2023/0148383 A1* | 5/2023 | Nakano | .................. | F16J 15/104 |
| | | | | 277/602 |

FOREIGN PATENT DOCUMENTS

| | | | | | |
|---|---|---|---|---|---|
| DE | 112019001323 | T5 | * | 11/2020 | ............. F16J 15/022 |
| JP | S59-004887 | U | | 1/1984 | |
| JP | H11-248060 | A | | 9/1999 | |
| JP | 2002-005295 | A | | 1/2002 | |
| JP | 2006-132662 | A | | 5/2006 | |
| JP | 2006-308052 | A | | 11/2006 | |
| JP | 2006-316806 | A | | 11/2006 | |
| JP | 2008-019914 | A | | 1/2008 | |
| JP | 2008-240916 | A | | 10/2008 | |
| JP | 2009-103303 | A | | 5/2009 | |
| JP | 2010-216507 | A | | 9/2010 | |
| JP | 2012-207738 | A | | 10/2012 | |
| KR | 100914854 | B1 | | 9/2009 | |

* cited by examiner

FLUID DEVICE

CROSS REFERENCE TO RELATED APPLICATIONS

This application is a national stage application, filed under 35 U.S.C. § 371, of International Application No. PCT/JP2019/010070, filed Mar. 12, 2019, which international application claims priority to and the benefit of Japanese Application No. 2018-054140, filed Mar. 22, 2018; the contents of both of which as are hereby incorporated by reference in their entireties.

BACKGROUND

Technical Field

The technique disclosed herein relates to a fluid device.

Description of Related Art

Japanese Unexamined Patent Publication No. 2006-308052 discloses an integrated panel that forms a piping system that is sealed by a ring-shaped gasket (fluid gasket) as an example of a fluid device such as an integrated panel, a valve, a pump, and an accumulator.

Specifically, the integrated panel of Japanese Unexamined Patent Publication No. 2006-308052 includes a flow port (first fluid input/output port portion, second fluid input/output port portion) open at an end face thereof, and an annular groove (tapered circumferential surface) for inserting the gasket arranged around each of the flow ports.

BRIEF SUMMARY

The integrated panel described in Japanese Unexamined Patent Publication No. 2006-308052 is configured to tighten the circumferential edge portion of the flow port by the gasket inserted into the annular groove. However, such a configuration left a room for improvement regarding smooth insertion of the gasket. Not being able to smoothly inserting the gasket causes a risk of defective sealing after the tightening.

In view of these problems, it is an object of the technique disclosed herein to enable smooth insertion of a gasket in a fluid device having a passage (flow path) which is to be sealed by the gasket, and to reliably achieve the sealing property of the gasket.

The technique disclosed herein relates to a fluid device including a passage which is to be sealed by insertion of an annular gasket. The fluid device includes: a flow port open to form one end of the passage; and an annular groove arranged along an outer circumferential edge of the flow port, the annular groove being open so as to insert the gasket therein. The annular groove has a radially-inner side interior wall and a radially-outer side interior wall. The radially-inner side interior wall has a portion which includes an open end of the annular groove and which forms a first tapered portion sloped radially outward from the open end of the annular groove in a depth direction. The radially-outer side interior wall has a portion extending throughout a predetermined range from the open end of the annular groove and forming a guide whose diameter is larger than a diameter of an outer circumferential surface of the gasket.

In the configuration, the portion of the radially-inner side interior wall of the annular groove including its open end has a tapered shape with an increased diameter. This allows the gasket to be guided into the annular groove. On the other hand, the portion of the radially-outer side interior wall of the annular groove extending throughout a predetermined range from the open end has a larger diameter than the outer circumferential surface of the gasket. This portion with the larger diameter serves as the guide.

Strictly speaking, a lateral cross section of the annular groove is an ellipse, rather than a perfect circle. However, the guide in the annular groove lowers the possibility of interference between the outer surface of the gasket and a portion of the annular groove in the vicinity of a minor axis having a relatively smaller diameter, where the annular groove is deemed as an ellipse. This lowers the possibility of the gasket being caught by the outer rim of the annular groove or the gasket being inclined with respect to the annular groove, consequently enabling smooth insertion of the gasket. Thus, the sealing property of the gasket is achievable.

A fluid device as described hereinabove enables smooth insertion of a gasket and achieves the sealing property of the gasket.

DETAILED DESCRIPTION OF VARIOUS EMBODIMENTS

Hereinafter, embodiments of the present disclosure will be described with reference to the drawings. Note that the following description is merely illustrative.

That is, although an integrated block will be described as an example of a fluid device in the present detailed statement, application of the technique disclosed herein is not limited thereto, and is applicable to a general purpose device capable of circulating a fluid.

Specifically, the "fluid device" of the present disclosure refers to, in an integrated block, an integrated panel, a valve, a pump, an accumulator, a fluid storage container, a heat exchanger, a regulator, a pressure gauge, a flow meter, a heater, flange piping, and the like, devices having a passage sealed by inserting an annular gasket.

<Overall Configuration>

Figure 1:
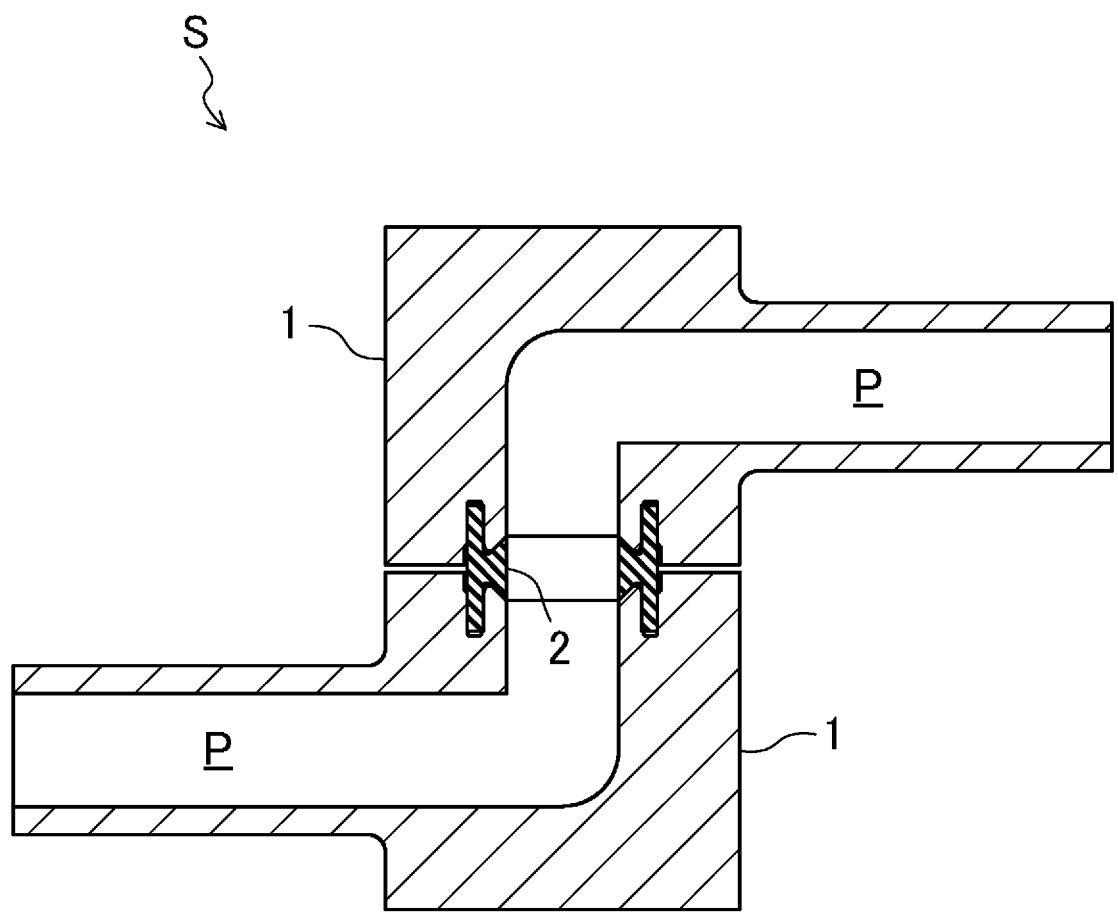
FIG. 1 is a vertical cross-sectional view of an exemplary configuration of a fluid system.

FIG. 1 is a vertical sectional cross-sectional view of an exemplary configuration of a fluid system S. A fluid system S shown in FIG. 1 includes two integrated blocks 1, and a gasket 2 sealing a connecting part of the integrated blocks 1. The fluid system S has therein an integrated passage P.

Both of the two integrated blocks 1 are configured such that the gasket 2 having an annular shape is inserted therein. The gasket 2, while being inserted into one of the integrated blocks 1, is inserted into another one of the integrated blocks 1 to connect passages P of the integrated blocks 1 together and seal the connecting part of the passages P, as shown in FIG. 1.

The following describes the integrated blocks 1 and the gasket 2 in this order.

<Integrated Block>

Figure 2A:
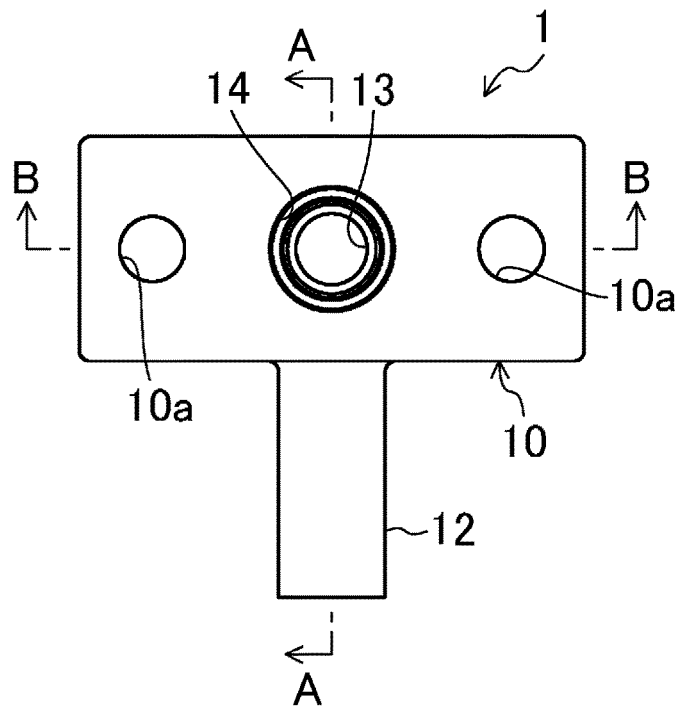
FIGS. 2A, 2B, and 2C are a trihedral figure illustrating an exemplary configuration of a fluid device.
Figure 2B:
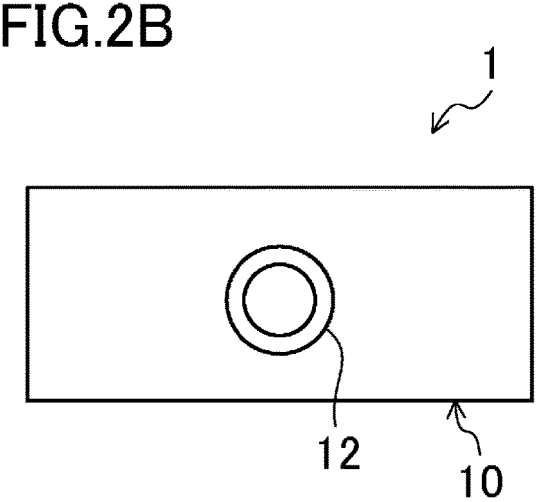
Figure 2C:
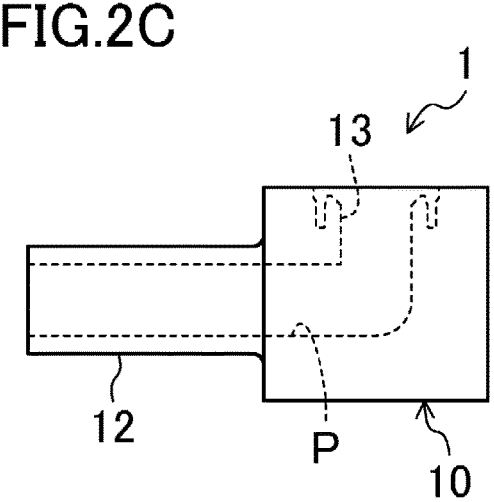
Figure 3:
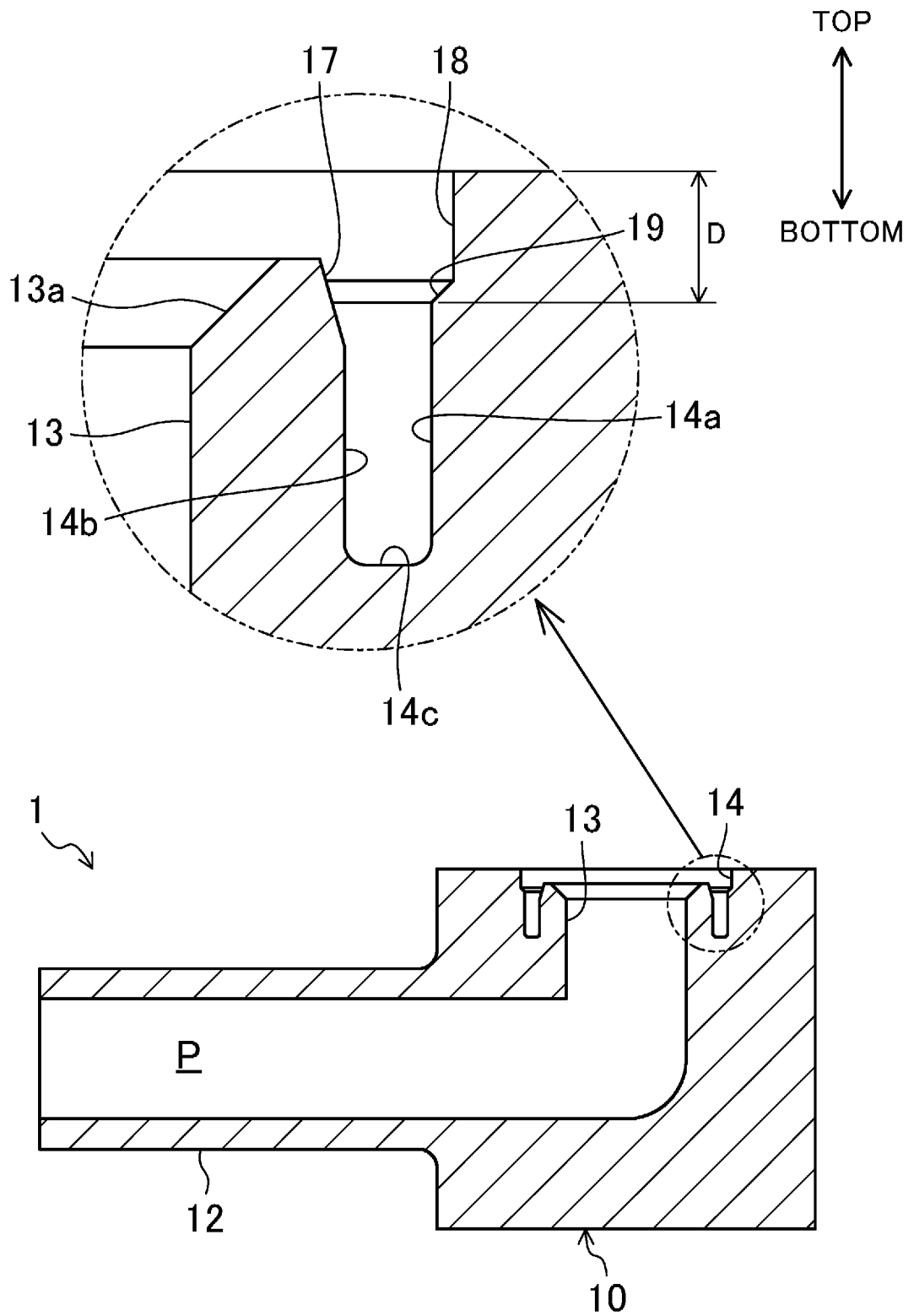
FIG. 3 is a sectional view of the fluid device taken along line A-A.
Figure 4:
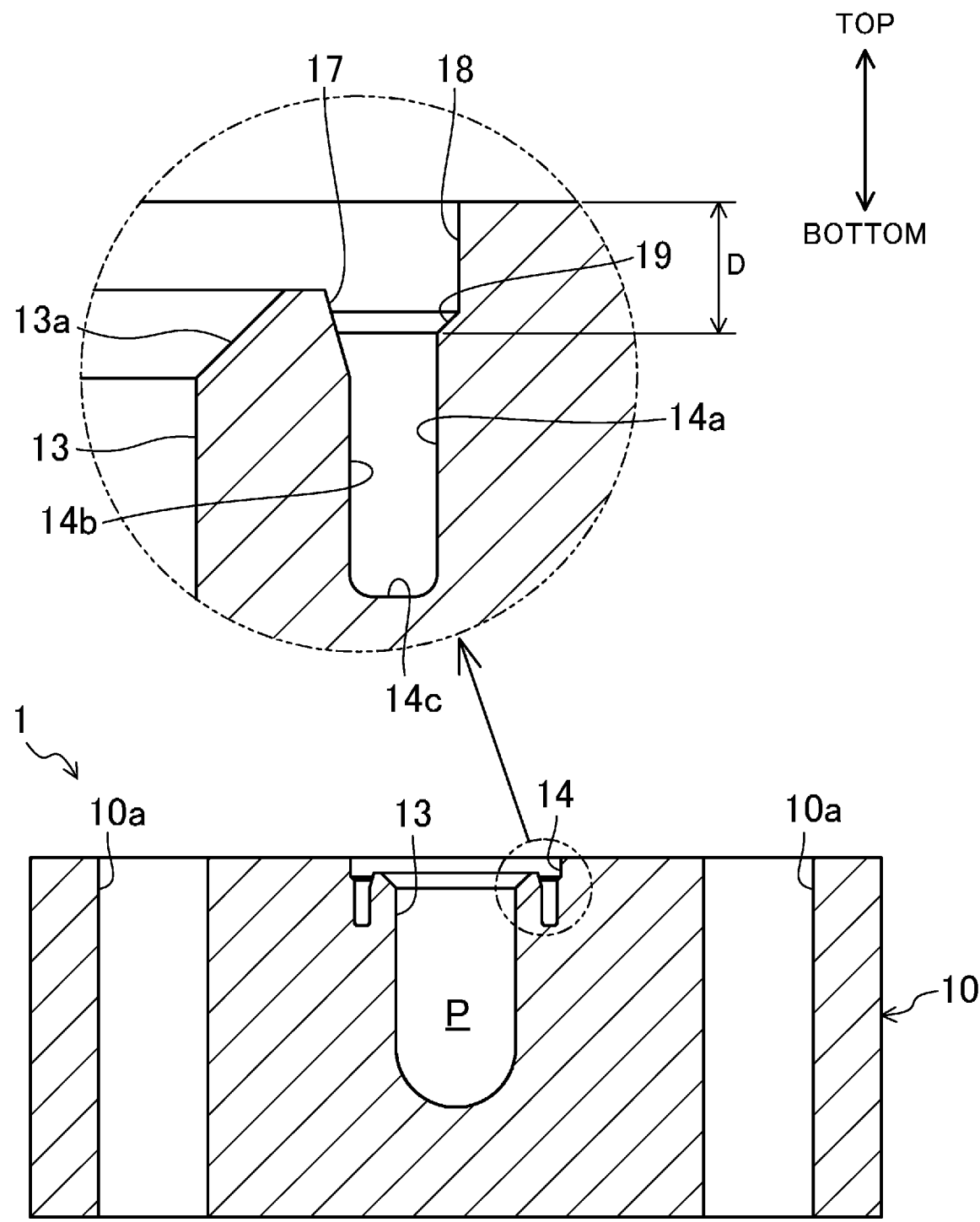
FIG. 4 is a sectional view of the fluid device taken along line B-B.

FIGS. 2A, 2B, and 2C are a trihedral figure illustrating an example configuration of a fluid device. FIG. 2A is a top view of one integrated block 1. FIG. 2B is a front view of the integrated block 1. FIG. 2C is a side view of the integrated blocks 1. FIG. 3 is a sectional view of the integrated block 1 taken along line A-A. FIG. 4 is a sectional view of the integrated block 1 taken along line B-B.

As shown in each view of FIGS. 2A, 2B, and 2C, the integrated block 1 includes, as main elements thereof, a block body 10, a conduit line 12, a flow port 13 open at the upper surface of the block body 10, and an annular groove 14 that surrounds the flow port 13.

Further, as shown in FIG. 2C, the integrated block 1 has the passage P formed in a penetrating manner from a front end of the conduit line 12 to the flow port 13. In short, the flow port 13 is open to serve as one end of the passage P.

The following describes elements of the integrated block 1 one by one.

The block body 10 is made of a thermoplastic resin such as a fluorocarbon resin, and has a rectangular exterior shape. In the upper surface of the block body 10, there is a pair of left and right bolt holes 10a for fastening the integrated blocks 1.

The flow port 13 is arranged at a center portion of the upper surface of the block body 10 and is formed as an opening with a circular lateral cross-section. As shown in an enlarged view in FIG. 3, an interior wall 13a in the vicinity of the open end (upper end) of the flow port 13 is tapered so that the upper end thereof has a larger diameter.

The annular groove 14 is provided along the outer circumferential edge of the flow port 13. The inner diameter of the annular groove 14 is slightly larger than the inner diameter of the gasket 2, and the outer diameter thereof is substantially the same as the outer diameter of the gasket 2 (see FIG. 6 and FIG. 7). As will be described later, the gasket 2 is inserted into this annular groove 14.

Further, a radially-outer side interior wall 14a of the annular groove 14 protrudes in a counter-depth direction more than a radially-inner side interior wall 14b of the annular groove 14. The "depth direction" herein refers to a direction (downward direction in the drawing) from the open end of the annular groove 14 toward a bottom portion (hereinafter referred to as "groove bottom") 14c of the annular groove 14. The "counter-depth direction" herein refers to the opposite direction (upward direction in the figure) to the depth direction.

The radially-inner side interior wall 14b of the annular groove 14 has a first tapered portion 17 formed by increasing the diameter of the open end of the annular groove 14. Specifically, the first tapered portion 17 is sloped radially outward from the open end of the annular groove 14 as it gets away from the open end of the annular groove 14 in the depth direction. The wording "radially outward" herein refers to a direction headed outward from inside the annular groove 14. The opposite direction to this direction is referred to as "radially inward".

On the other hand, the radially-outer side interior wall 14a of the annular groove 14 has a guide 18 formed by increasing the diameter of a portion around the open end, with a substantially constant diameter. Specifically, this guide 18 extends throughout a predetermined range D from the open end of the annular groove 14 in the depth direction, and has a larger diameter than the outer circumferential surface 22a of the gasket 2 (see FIG. 6). That is, this guide 18 has a shape that widens the annular groove 14.

Note that the dimension D in the depth direction of the guide 18 is longer than the dimension of the first tapered portion 17 in the same direction. Further, as described above, the radially-outer side interior wall 14a of the annular groove 14 protrudes in a counter-depth direction more than the radially-inner side interior wall 14b of the annular groove 14. Therefore, in the depth direction, an end of the guide 18 on the side of the groove bottom 14c is more distanced from the groove bottom 14c than an end of the first tapered portion 17 on the side of the groove bottom 14c. In other words, the first tapered portion 17 is closer to the groove bottom 14c in the depth direction as compared to the guide 18.

The guide 18 has, at the end thereof, on the side of the groove bottom 14c, a second tapered portion 19 sloped in a direction opposite to the first tapered portion 17 on the inner diameter side. Specifically, the second tapered portion 19 is sloped radially inward from the end of the guide 18 so as to extend further radially inward as it gets away from the end in the depth direction. The second tapered portion 19 is sloped more steeply than the first tapered portion 17.

As shown in FIG. 3 to FIG. 4, the second tapered portion 19 is arranged so as to overlap with the first tapered portion 17 in relation to the depth direction. The dimension of the second tapered portion 19 in relation to the depth direction is shorter than the dimension of the first tapered portion 17 in relation to the same direction. In the depth direction, an end of the second tapered portion 19 on the side of the groove bottom 14c is more distanced from the groove bottom 14c as compared with the end of the first tapered portion 17 on the side of the groove bottom 14c.

<Gasket>

Figure 5:
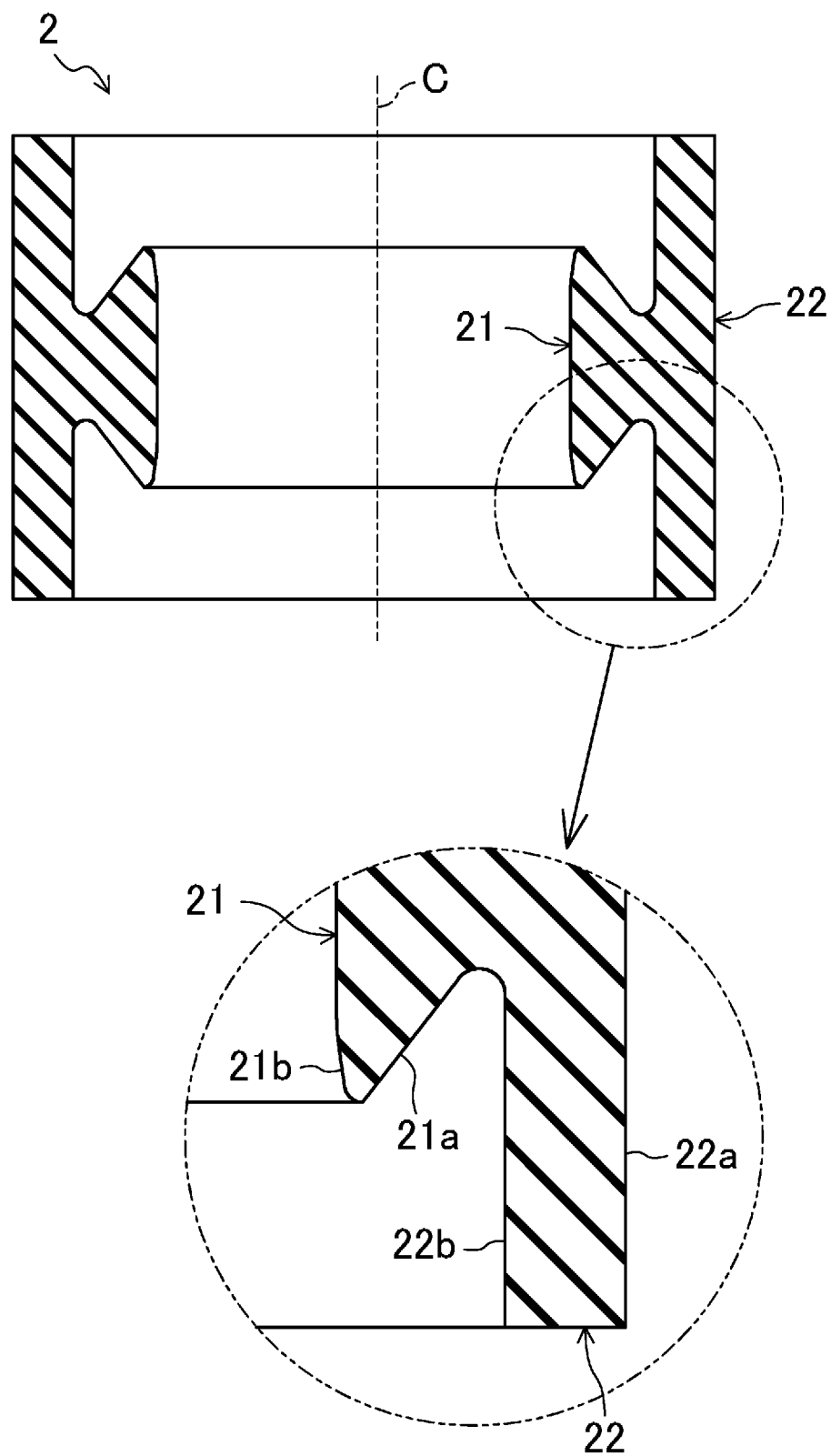
FIG. 5 is a vertical cross-sectional view of an exemplary configuration of a gasket.

FIG. 5 is a vertical cross-sectional view of an exemplary configuration of the gasket 2.

The gasket 2 is made of a thermoplastic resin such as a fluorocarbon resin, and has a substantially tubular shape. Specifically, this gasket 2 has a first sealing portion 21 which is to be inserted into the flow port 13 of the integrated blocks 1, and a second sealing portion 22 formed in one piece with the first sealing portion 21 which is to be inserted into the annular groove 14 of the integrated blocks 1.

More specifically, the first sealing portion 21 is formed in a cylindrical shape and its outer circumferential surface 21a is sloped radially inward from its middle portion relative to a center axial direction (see broken line C in FIG. 5) as it gets away from the middle portion in the center axial direction. With such a slope, when the first sealing portion 21 is inserted into the flow port 13, the outer circumferential surface 21a of the first sealing portion 21 and the interior walls 13a of the flow ports 13 of the integrated blocks 1 are firmly attached to each other. Further, the outer circumferential surface 21a of the first sealing portion 21 is integrally connected with an inner circumferential surface 22b of the second sealing portion 22, at the middle portion relative to the center axial direction.

The diameter of the inner circumferential surface 21b of the first sealing portion 21 is substantially the same as that of the flow port 13. When the gasket 2 is inserted into the integrated blocks 1, the inner circumferential surface 21b integrally forms a passage with the passage P formed by the integrated block 1.

The second sealing portion 22 is arranged radially outward from the first sealing portion 21 and has a cylindrical shape with a diameter larger than that of the first sealing portion 21. The second sealing portion 22 is formed thicker in the radial direction than the annular groove 14 (see FIG. 6 and FIG. 7).

Specifically, the outer circumferential surface 22a of the second sealing portion 22 has substantially the same diameter as the radially-outer side interior wall 14a of the annular groove 14 (i.e., the portion excluding the guide 18). Further, the inner circumferential surface 22b of the second sealing portion 22 has a slightly smaller diameter than the radially-inner side interior wall 14b of the annular groove 14 (i.e., the portion excluding the first tapered portion 17).

<Insertion of Gasket into Integrated Block>

Figure 6:
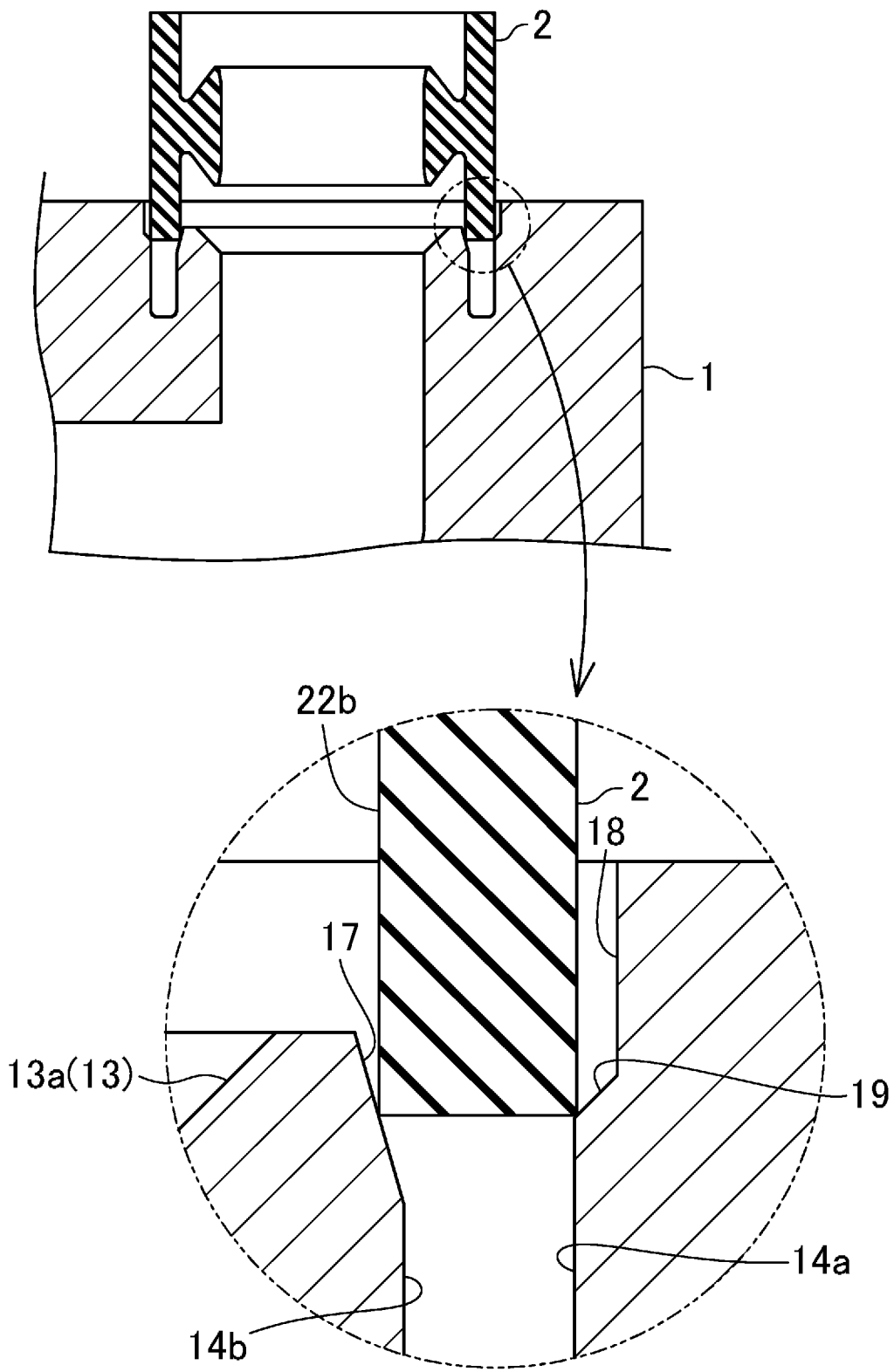
FIG. 6 is an explanatory drawing illustrating an exemplary procedure of inserting the gasket into the fluid device.
Figure 8:
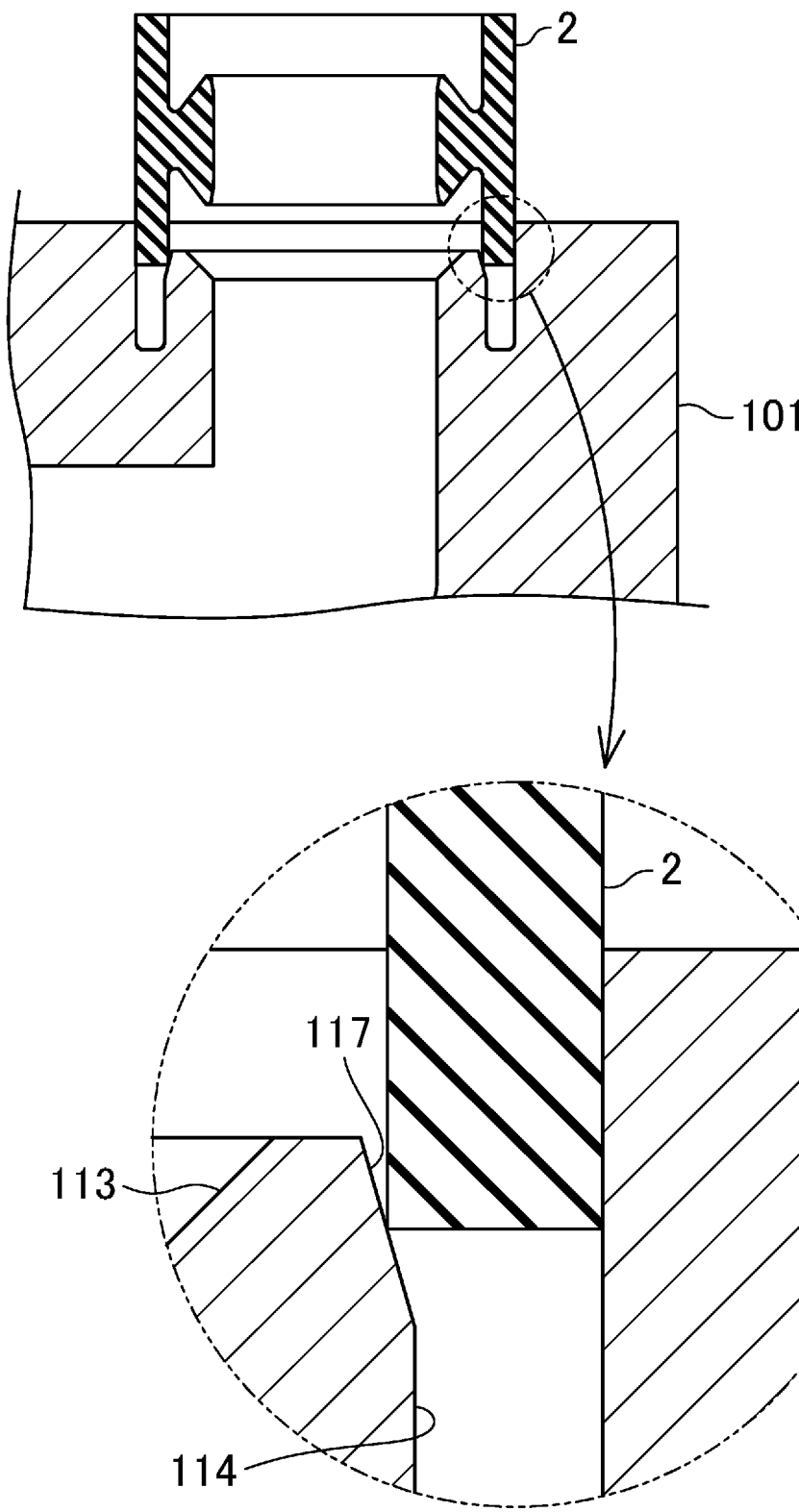
FIG. 8 is a view corresponding to FIG. 6, which illustrates an exemplary configuration with only a first tapered portion.
Figure 9:
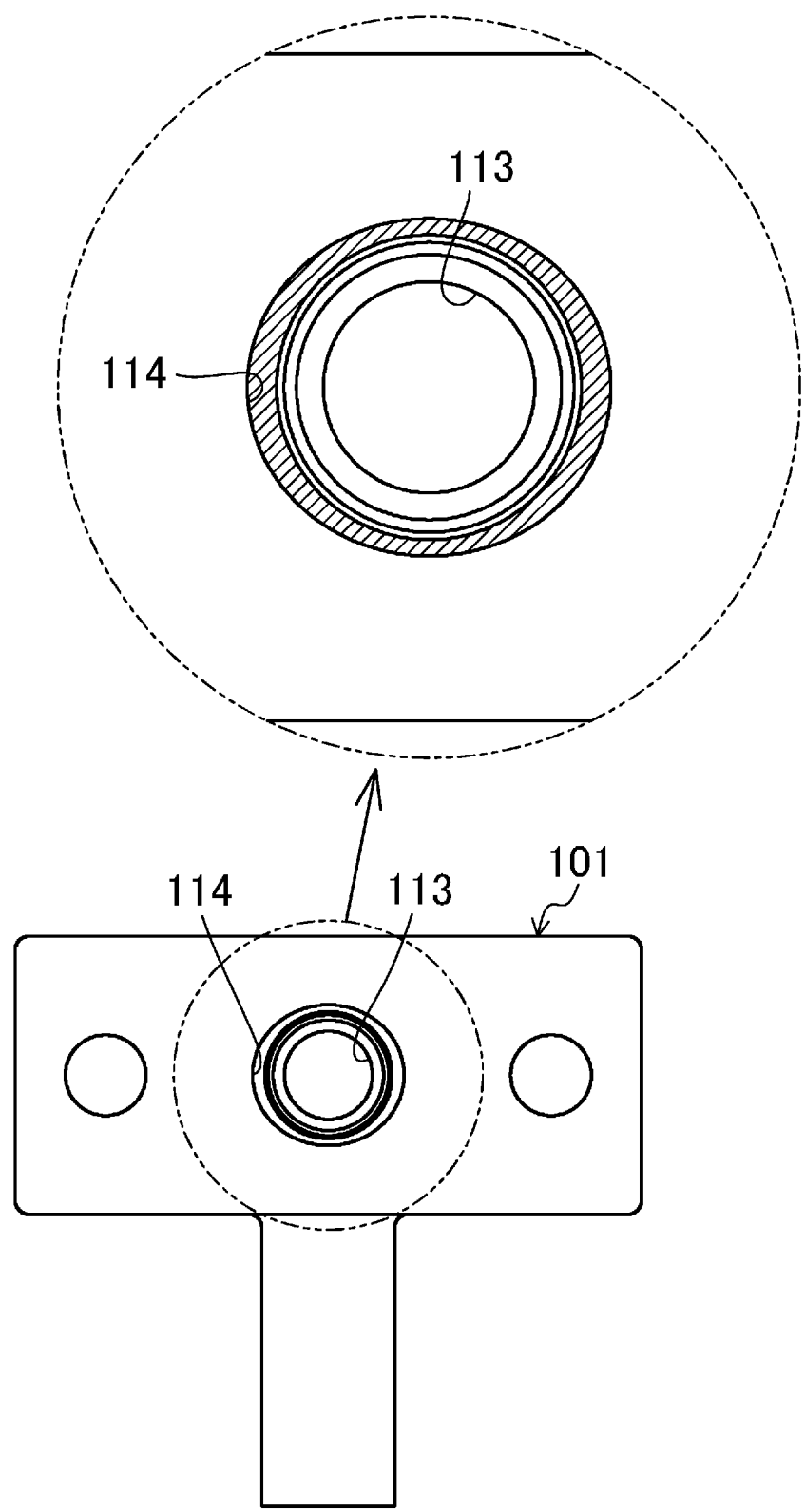
FIG. 9 is a top view of the exemplary configuration with only the first tapered portion.

FIG. 8 is a diagram corresponding to FIG. 6, illustrating an exemplary configuration with only a first tapered portion 117 provided to an annular groove 114, and FIG. 9 is a top view of the same.

In an integrated block 101 shown in FIG. 8, the annular groove 114 is arranged along the outer circumferential edge of the flow port 113. The annular groove 114 has the first tapered portion 117 similar to that described in the present embodiment. This first tapered portion 117 allows guiding of insertion of the gasket 2 (specifically, positioning and tightening of the gasket 2).

However, as shown in the enlarged view of FIG. 9, the shape of annular groove 114 is often an ellipse, rather than a perfect circle, due to manufacturing tolerances and the like (see a hatched area in FIG. 9).

Figure 10:
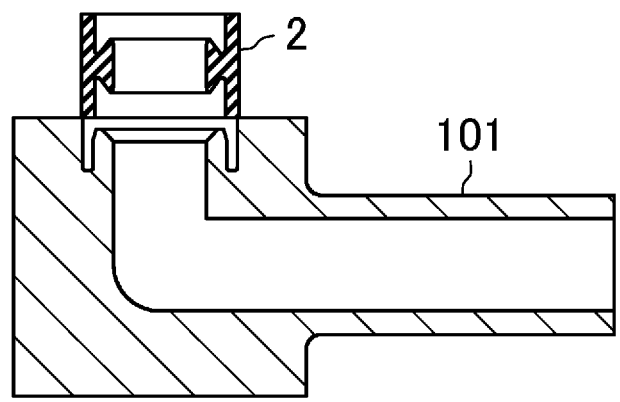
FIG. 10 is an explanatory drawing illustrating a problem in the configuration with only the first tapered portion.
Figure 11:
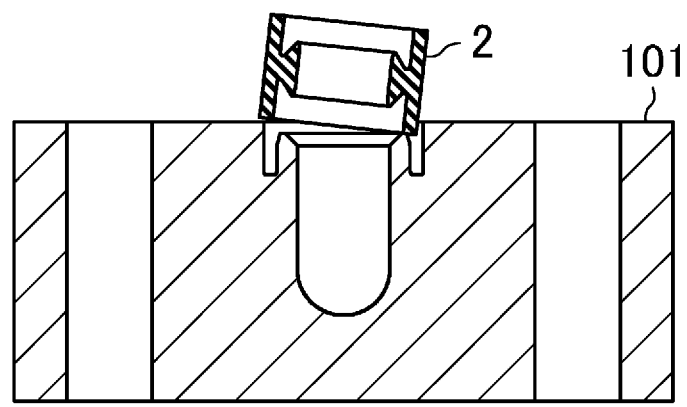
FIG. 11 is an explanatory drawing illustrating a problem in the configuration with only the first tapered portion.

For this reason, it may be difficult to achieve a smooth insertion of the gasket 2 even if the gasket 2 is guided by the first tapered portion 117. Where the annular groove 114 is deemed as an ellipse, the portion near the minor axis has a smaller diameter than the portion near the major axis of the same ellipse. For this reason, when the gasket 2 is inserted as shown in FIG. 10 to FIG. 11, a portion of the annular groove 114 near the minor axis interferes with the outer surface of the gasket 2 and there is a possibility that the gasket 2 being caught on that portion of the annular groove 114 or inserted in an inclined posture.

The integrated block 1 of the present embodiment, on the other hand, has the guide 18 on the radially-outer side interior wall 14a in addition to the first tapered portion 17 of the radially-inner side interior wall 14b. The guide 18 arranged throughout the predetermined range D from the open end of the annular groove 14 has a larger diameter than the outer circumferential surface 22a of the second sealing portion 22 of the gasket 2. This configuration lowers the possibility of interference between the outer rim of the annular groove 14 and the gasket 2, and lowers the possibility of the gasket 2 being caught by the outer rim of the annular groove 14 or the gasket 2 being inclined with respect to the annular groove 14, even if the shape of the annular groove 14 is an ellipse. Therefore, smooth insertion of the gasket 2 is possible.

Figure 7:
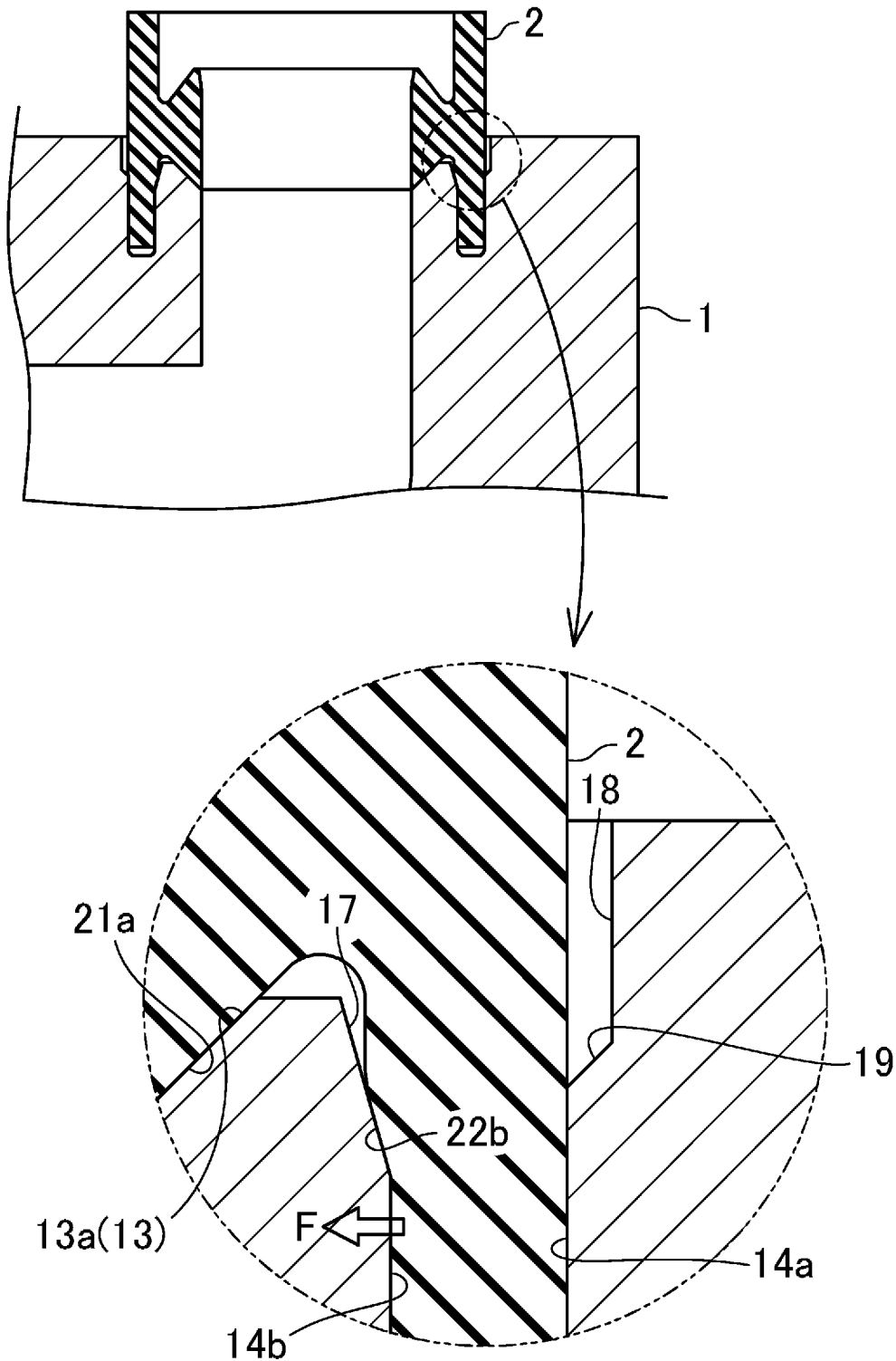
FIG. 7 is an explanatory drawing illustrating the exemplary procedure of inserting the gasket into the fluid device.

The following describes action and effect as well as actions and effects accompanied with them, with reference to FIG. 6 to FIG. 7. FIG. 6 to FIG. 7 are each an explanatory drawing illustrating an exemplary procedure of inserting the gasket 2 into the integrated block 1 (fluid device).

When the gasket 2 is placed from the above to the flow port 13 of the integrated block 1, the inner diameter side of the second sealing portion 22 contacts the first tapered portion 17, as shown in FIG. 6. This is because the inner circumferential surface 22b of the second sealing portion 22 has a slightly smaller diameter than a portion of the radially-inner side interior wall 14b of the annular groove 14 excluding the first tapered portion 17 (i.e., the thickness of the gasket 2 is slightly larger than the width of the annular groove 14), as described above.

On the other hand, the portion of the second sealing portion 22 on the outer diameter side is inserted into the annular groove 14 and contacts the second tapered portion 19. This is because the guide 18 is arranged on the outer diameter side of the annular groove 14. That is, as a result of the annular groove 114 being an ellipse, the gasket 2 may interfere with the portion near the minor axis of the ellipse. However, the possibility of such an interference can be lowered with the guide 18 having a larger diameter than the outer circumferential surface 22a of the gasket 2, as shown in FIG. 6.

Further, by providing the second tapered portion 19 in addition to the guide 18, it is possible to guide the gasket 2 radially inward. Meanwhile, the first tapered portion 17, sloped in the direction opposite to the second tapered portion 19, guides the gasket 2 radially outward. Thus, a configuration with a combination of the first tapered portion 17 and the second tapered portion 19 properly positions the gasket 2 in relation to the radial direction.

In particular, the first tapered portion 17 and the second tapered portion 19 are arranged in substantially the same position in relation to the depth direction of the annular groove 14 (arranged to overlap with each other), as shown in FIG. 3 and FIG. 4. Such an arrangement allows positioning with respect to the first tapered portion 17 and positioning with respect to the second tapered portion 19 to be performed at the same time. This is effective in properly positioning the gasket 2.

Further, when bolts are fastened through the bolt holes 10a after the other integrated block is placed from above with respect to the gasket 2, the gasket 2 is guided to the groove bottom 14c of the annular groove 14, and at the same time, the second sealing portion 22 of the gasket 2 is compressed radially outward (in the width direction) by the first tapered portion 17 as shown in FIG. 7.

Therefore, when the gasket 2 is inserted into the annular groove 14, the second sealing portion 22 exerts a radially inward restoring force (see arrow mark F in FIG. 7). Due to this restoring force, the inner circumferential surface 22b of the second sealing portion 22 is firmly attached to the radially-inner side interior wall 14b of the annular groove 14, thus forming a sealing surface (so-called secondary sealing surface) for sealing the fluid.

On the other hand, when the gasket 2 is inserted into the annular groove 14, the outer circumferential surface 21a of the first sealing portion 21 is firmly attached to the interior wall 13a of the flow port 13, thus forming another sealing surface (so-called primary sealing surface) positioned further inner diameter side than the second sealing portion 22.

As can be seen from FIG. 7, the flow port 13 of the integrated block 1 is held and tightened by the first sealing portion 21 and the second sealing portion 22 when the gasket 2 is inserted. Meanwhile, the second sealing portion 22 of the gasket 2 is tightened by the annular groove 14 of the integrated block 1. With the integrated block 1 and the gasket 2 tightening each other as described above, a favorable sealing property can be achieved.

As described above, the guide 18 is arranged on the outer diameter side rather than the inner diameter side of the annular groove 14. Therefore, unlike the configuration of having the guide 18 on the inner diameter side, the above configuration is less likely to cause an issue in achieving the sealing property when the gasket 2 holds the flow port 13. Therefore, the above configuration is effective in achieving both the sealing property of the gasket 2 and the smoothness of inserting the gasket 2.

The gasket 2 is made by molding using a thermoplastic resin as hereinabove described. Although illustration is omitted, in a preferred embodiment, a gate for injecting a resin into molds at the time of resin molding the gasket 2 is provided on the outer circumferential surface 22a of the second sealing portion 22, instead of the first sealing portion 21, for the following reason.

Namely, in cases where the gasket 2 is formed by resin molding, the gasket 2 after molding has a trace of the gate or a runner in the form of a projection. The first sealing portion 21 of the gasket 2 forms an integrated passage together with the passage P formed in the integrated block 1 or firmly touches the interior wall 13a of the flow port 13. For this reason, providing the gate to the first sealing portion 21 is not preferable for the sake of reducing the passage resistance and achieving the sealing property.

On the other hand, the inner circumferential surface 22b of the second sealing portion 22 of the gasket 2 holds and seals the flow port 13 together with the outer circumferential surface 21a of the first sealing portion 21. Therefore, providing the gate to the inner circumferential surface 22b is not preferable for the sake of achieving the sealing property.

In view of the above, another approach is to provide the gate to the outer circumferential surface 22a of the second sealing portion 22. However, depending on the arrangement of the gate, there is a possibility that the trace of, e.g., the gate may interfere with the open end of the annular groove 14 (in particular, the outer diameter side of the open end), when the gasket 2 is inserted into the annular groove 14.

However, with the guide 18 on the outer diameter side of the annular groove 14 as shown in FIG. 6, the trace of, e.g., the gate is inserted in a space formed by the guide 18. This lowers the possibility of the trace of, e.g., the gate interfering with the annular groove 14.

Another Embodiment

The above-described embodiment deals with a case where the radially-outer side interior wall 14a of the annular groove 14 protrudes in the counter-depth direction as compared to the radially-inner side interior wall 14b. However, the present disclosure is not limited to such a configuration. The radially-outer side interior wall 14a or the radially-inner side interior wall 14b does not have to protrude from the other. The radially-outer side interior wall 14a and the radially-inner side interior wall 14b may be at the same level.

DESCRIPTION OF REFERENCE CHARACTERS

1 Integrated Block (Fluid Device)
13 Flow Port
14 Annular Groove
14a Interior Wall (Radially-Outer Side Interior Wall)
14b Interior Wall (Radially-Inner Side Interior Wall)
14c Groove Bottom
17 First Tapered Portion
18 Guide
19 Second Tapered Portion
2 Gasket
21 First Sealing Portion
22 Second Sealing Portion
22a Outer Circumferential Surface (Outer Circumferential Surface of Gasket)
P Passage
D Range

The invention claimed is:

1. A fluid device including a passage which is to be sealed by insertion of an annular gasket, the device comprising:
   a flow port open to form one end of the passage; and
   an annular groove arranged along an outer circumferential edge of the flow port, the annular groove being open so as to insert the gasket therein,
   wherein:
   the annular groove has a radially-inner side interior wall and a radially-outer side interior wall,
   the radially-inner side interior wall having includes:
      a first tapered portion which includes an open end of the annular groove and which slopes radially outward from the open end of the annular groove in a depth direction, and
      a first portion that is continuous with the first tapered portion in the depth direction, extends to a bottom portion of the annular groove in the depth direction, and has a larger diameter than the first tapered portion,
   the radially-outer side interior wall includes:
      a guide extending throughout a predetermined range from the open end of the annular groove and having a diameter that is larger than a diameter of an outer circumferential surface of the gasket, and
      a second portion that extends to the bottom portion in the depth direction and has a smaller diameter than the guide, and
      a thickness of the gasket in a radial direction is larger than a width between the first portion and the second portion.

2. The fluid device of claim 1, wherein the first tapered portion is closer to a bottom of the annular groove in the depth direction, as compared to the guide.

3. The fluid device of claim 1, wherein the guide of the annular groove has an end which is adjacent to a bottom of the annular groove, the end having a second tapered portion sloped radially inward.

4. The fluid device of claim 3, wherein second tapered portion is arranged so as to overlap with the first tapered portion in relation to the depth direction.

5. The fluid device of claim 1, wherein the gasket is made by molding using a thermoplastic resin.

6. The fluid device of claim 1, wherein:
   the gasket comprises a first sealing portion and a second sealing portion each having an annular shape, the first sealing portion being to be inserted into the flow port, the second sealing portion being arranged radially outward from the first sealing portion and being to be inserted into the annular groove, and
   the flow port is held by the first sealing portion and the second sealing portion when the gasket is inserted.

7. The fluid device of claim 6, wherein:
   an outer circumferential surface of the first sealing portion and an inner circumferential surface of the second sealing portion face each other and are spaced away from each other in the radial direction, and the flow port is held by the outer circumferential surface of the first sealing portion and the inner circumferential surface of the second sealing portion when the gasket is inserted.

* * * * *